Patented Dec. 1, 1936

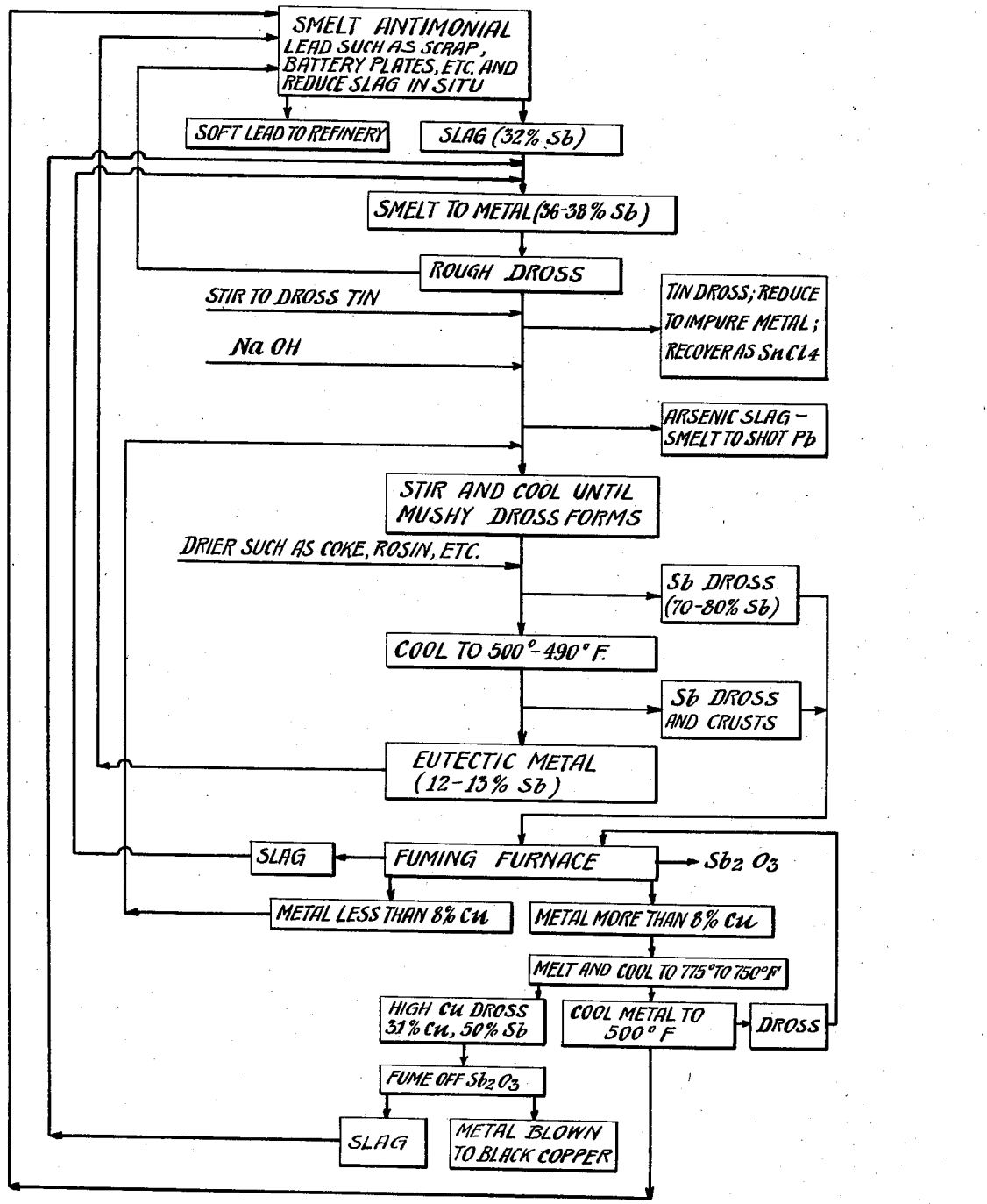

2,062,838

UNITED STATES PATENT OFFICE 2,062,838

ANTIMONY PROCESS

Ray C. Skow, Metuchen, N. J., assignor to American Smelting and Refining Company, New York, N. Y., a corporation of New Jersey Application January 23, 1936, Serial No. 60,422

9 Claims. (Cl. 75—78)

This invention relates to the metallurgy of antimony and particularly concerns certain improvements in concentrating and recovering antimony or antimony compounds from the by-products resulting from processes for treating various antimonial lead materials.

Thus in smelting scrap storage battery plates or materials of similar composition, there may be obtained a slag consisting principally of lead and antimony with much smaller amounts of such elements as arsenic, copper and tin. Such a slag may be smelted to metal and the bulk of the antimony therein concentrated in a product containing 65% to 80% antimony in accordance with United States Letters Patent No. 2,007,545, dated July 9, 1935, to Harold H. Monson.

While the high antimony product may be further treated in several manners for the ultimate recovery of its antimony and lead contents, it has been found that the product is admirably suited for the production of antimony oxide in accordance with United States Letters Patent No. 2,035,454, dated March 31, 1936, to Jesse O. Betterton.

The present invention provides improvements, including certain new and original steps and arrangements and combinations thereof, in the treatment of antimony-bearing slags and drosses and the recovery of their constituent values.

The drawing accompanying and forming a part of this specification is a flow sheet illustrating the invention.

As shown by the flow sheet, antimonial lead scrap such as scrap battery plates, etc. are smelted and reduced in situ to yield soft lead and an antimony slag. This smelting and reducing process is suitably performed in a furnace of the reverberatory type. The antimony slag is transferred to a blast or reverberatory furnace to which is also added slags from the fuming and converter furnaces hereinafter referred to and the combined slags smelted to metal. This metal is then rough drossed and the tin and arsenic removed as shown by the flow sheet.

Following the removal of the tin and arsenic, the metal which still contains some copper is stirred and cooled until a mushy dross forms, the treatment being effected in accordance with Patent No. 2,007,545 hereinbefore mentioned. This dross containing the bulk of the antimony is suitably dried as by rosin and/or coke and removed from the bath. The bath is then further cooled to a temperature of approximately 500° F. to 490° F. to freeze out crusts high in antimony which are added to the dry dross previously removed and the remaining (eutectic) metal is returned to the initial furnace for resmelting with additional scrap battery plates or other antimonial lead scrap.

The combined drosses and crusts (65%–80% Sb) are sent to a fuming furnace for the recovery of antimony oxide. In the fuming furnace there is produced, in addition to the volatilized antimony oxide, a slag and an antimonial lead metal. The slag is returned to the furnace in which the original antimony slag from the scrap smelting furnace is treated while the antimonial lead metal is treated in one of two ways according to its copper content.

In accordance with the invention it has been found that the antimonial lead metal from the fuming furnace may be returned to the process following the tin and arsenic removal operations and before the antimony concentration by agitation and cooling so long as the copper content does not exceed approximately 8%. However, when the concentration does exceed that approximate figure, the antimonial lead residue from the fuming furnace is transferred to a separate vessel and treated by cooling it to approximately 775° F. to 750° F. whereupon a high copper antimony dross forms. The remaining metal is then further cooled, say to 500° F., drossed, and the dross which is very high in antimony returned to the fuming furnace. The high copper dross is charged to a fuming kettle and a large portion, say 50%, of the antimony converted to the oxide. The major portion of the remaining antimony enters into a slag and is returned with the slag from the fuming furnace to the furnace in which the original antimony slag resulting from the initial scrap smelting is treated. The metal remaining after the fuming of the high copper dross and which may analyze 55% to 60% copper, 25% antimony and 20% lead is blown to black copper for subsequent refining to copper and antimonial lead which may be recycled through the process.

As illustrative of the results which may be expected in treating the antimonial lead metal from the fuming furnace which contains more than approximately 8% copper, a run of such metal which analyzed 12.31% copper and 41.84% antimony at 1000° F. showed a reduction of the copper content to 1.41% and of the antimony content to 33.48% when cooled to 750° F. When further cooled to 500° F. the copper content was reduced to 0.04% and the antimony content to 11.77%. The analyses of the copper drosses removed were as follows:

| Temperature | Percent copper | Percent antimony |
|---|---|---|
| 1000° F. to 800° F | 30.39 | 49.22 |
| 800° F. to 700° F | 12.30 | 62.70 |
| 700° F. to 500° F | 8.02 | 67.95 |

It will be noted from the above analyses that the dross obtained between 700° F. and 500° F.

contained approximately 8% copper and 67.95% antimony which was suitable for returning to the fuming furnace. The higher copper drosses were suitable for fuming off of antimony oxide as shown in the flow sheet and as hereinbefore described. The antimony oxide so obtained may be resublimed to yield a high grade product.

What is claimed is:

1. The process for treating antimonial lead which comprises softening same thereby obtaining the antimony as a slag, smelting said slag to metal, concentrating the antimony in a dross, treating said dross in a fuming furnace thereby obtaining antimony oxide, a slag and antimonial lead metal, recycling the slag from the fuming furnace to the smelting operation of slag from the softening step, recycling the antimonial lead metal from the fuming furnace to the antimony dross concentration step until the copper content of the said antimonial lead metal builds up to approximately 8% and thereafter cooling the antimonial lead metal to yield a high copper dross and reduce the copper content of the metal to below 8%.

2. The process according to claim 1 in which the high copper dross is fumed to yield antimony oxide, an antimony slag and residual metal.

3. A process according to claim 1 in which the metal after separation of the high copper dross is further cooled to yield a dross relatively high in antimony which is returned to the fuming furnace and a residual metal suitable for return to the softening operation.

4. The process for treating copper-bearing antimonial lead which comprises concentrating the antimony in a dross containing 70% to 80% antimony, volatilizing antimony oxide from said dross, recycling the residual metal until the copper content exceeds approximately 8% and then cooling the residual metal sufficiently to separate a high copper dross therefrom thereby yielding the metal suitable for recycling through the process.

5. In the volatilization of antimony oxide from copper-bearing antimonial lead containing in excess of 65% antimony, the improvement which comprises withdrawing the residual metal when the copper content exceeds 8%, cooling same sufficiently to separate the bulk of the copper as a high copper dross, fuming said dross thereby producing antimony oxide, an antimonial slag and metal high in copper, recycling the antimonial slag for concentration of its antimony content and further cooling the withdrawn residual metal thereby yielding a high antimony dross suitable for return for the volatilization of antimony oxide.

6. The process for preparing antimony oxide which comprises softening antimonial lead thereby yielding an antimonial slag, reducing and concentrating said slag into an antimonial product containing from 65% to 80% of antimony, volatilizing antimony oxide from said product, recycling the residual metal until the copper content builds up to approximately 8%, then withdrawing the residual metal, cooling same thereby separating a high copper dross, further cooling the drossed metal to yield a high antimony dross, returning said dross for the volatilization of antimony oxide, and returning the final metal to the softening stage.

7. The process for treating antimonial lead which comprises softening the lead, reducing and smelting the antimony slag therefrom to metal, removing tin and arsenic from said metal, concentrating same into a high antimony product and eutectic metal, treating the high antimony product in a fuming furnace thereby yielding antimony oxide, an antimonial slag and residual metal, recycling the residual metal to the concentrating operation until the copper content of the residual metal approximates 8% copper, withdrawing the residual metal when its copper content exceeds 8%, cooling same thereby obtaining a high copper dross, further cooling same to yield a relatively high antimony dross and a final residual metal, returning the relatively high antimony dross to the fuming furnace, volatilizing antimony oxide from the high copper dross leaving a slag and metal, returning the last mentioned slag and the slag from the fuming furnace for concentration into the high antimony product and returning the eutectic metal and the final residual metal for softening with a further quantity of antimonial lead.

8. The process for treating copper-bearing antimonial lead which comprises forming a concentrated antimony product therefrom, fuming said products to produce antimony oxide, recirculating the residual metal from the fuming operation until the copper concentration renders the residual metal unfit for further recirculation, withdrawing such residual metal from the system, treating same to substantially lower its copper content and returning the copper depleted product to the system.

9. The process according to claim 8 in which the residual metal withdrawn from the system is first cooled to separate out dross high in copper and then further cooled to yield a dross high in antimony and sufficiently low in copper to permit its return to the fuming operation.

RAY C. SKOW.